United States Patent
Marzouki et al.

(10) Patent No.: US 8,994,589 B2
(45) Date of Patent: Mar. 31, 2015

(54) ORIENTATION AND LOCALIZATION SYSTEM

(76) Inventors: Abdelwahed Marzouki, Evry (FR); Djamal Zeghlache, Etiolles (FR)

(*) Notice: Subject to any disclaimer, the term of this patent is extended or adjusted under 35 U.S.C. 154(b) by 660 days.

(21) Appl. No.: 13/265,934

(22) PCT Filed: Apr. 23, 2009

(86) PCT No.: PCT/IB2009/005826
§ 371 (c)(1),
(2), (4) Date: Mar. 9, 2012

(87) PCT Pub. No.: WO2010/122370
PCT Pub. Date: Oct. 28, 2010

(65) Prior Publication Data
US 2012/0162012 A1    Jun. 28, 2012

(51) Int. Cl.
G01S 3/16 (2006.01)
G01S 5/04 (2006.01)
G01S 3/02 (2006.01)
G01S 3/72 (2006.01)
G01S 5/02 (2010.01)
G01S 5/14 (2006.01)

(52) U.S. Cl.
CPC ............... *G01S 3/72* (2013.01); *G01S 5/0289* (2013.01); *G01S 5/14* (2013.01)
USPC ............ 342/378; 342/442; 342/443; 342/463

(58) Field of Classification Search
USPC ......................... 342/378, 442, 443, 457, 463; 455/456.1, 456.6
See application file for complete search history.

(56) References Cited

FOREIGN PATENT DOCUMENTS

WO    2007/133264 A    11/2007

OTHER PUBLICATIONS

International Search Report for Appln. No. PCT/IB2009/005826 mailed Jan. 15, 2010.
Xian-Zhong Xie et al., "A One-Step Method for Blind Indentification of MIMO Signal", Computing, Communication, Control and Management, Aug. 2008, pp. 523-527.
Yingtao et al. "MIMO-OFDM Blind Multi-CFO Estimation: CS-MUSIC", Microwave and Millimeter Wave Technology, Apr. 2007, pp. 1-4.
Fei et al., "Polarization Modelling for MIMO Channel", Communications and Networking in China, Aug. 2009, pp. 1-5.

*Primary Examiner* — Dao Phan
(74) *Attorney, Agent, or Firm* — Carter, DeLuca, Farrell & Schmidt, LLP

(57) ABSTRACT

An orientation and localization system is provided with spatial filtering capabilities that combines time polarization and space diversity to detect the direct lines of sight (LOS) and to deliver location and orientation estimates of mobile nodes.

16 Claims, 9 Drawing Sheets

ORIENTATION AND LOCALIZATION SYSTEM

FIELD OF THE INVENTION

The present invention relates generally to positioning in wireless systems, more particularly to an orientation and localization system with spatial filtering capabilities that combines time, polarization and space diversity to detect the line of sight (LOS) and to deliver location and orientation estimates of the mobile nodes.

BACKGROUND OF THE INVENTION

Such a system is useful for delivering reliable estimates of the location and the orientation of an object. The system can be used either in a multipath radio environment in which the object, that is the subject of the location and orientation finding, does not share a direct line of sight with the positioning radio station or in a radio environment in which there is at least one line of sight between the object to locate and the positioning station. Such a system is able to operate in indoor and outdoor environments. It provides also spatial filtering solutions that are useful for other wireless network services, such as interference mitigation and capacity improvement.

The localization of a remote object needs intermediate parameters concerning the relative localization and orientation of intermediate relay nodes. In this case, it is important to know perfectly not only the relative location of relay nodes but also their relative orientation.

An orientation finder device of the above kind is known from the patent document EP 11617 601 which is related to ad hoc networks. The system, as disclosed in this patent document is intended to provide the positioning information needed by these networks.

Another application is related to clusters of marine buoys which are floating in the sea in view to measure some water parameters such as: temperature, salinity . . . and also other aerial ones such as strength of the wind and so on, concerning a given area. The geographical orientations of these buoys must be considered with care in view of the trajectory planning.

An object of the present invention is to provide a device having better performance than prior art and, notably, to provide orientation of objects without a need of many access points or anchor points (GPS satellites are using triangulation).

SUMMARY OF THE INVENTION

According to the invention, the above mentioned system is remarkable in that the system realizes, at least, the following tasks:

Multipath signal detection and non line of sight (NLOS) MIMO channel estimation by estimating the cross-polarized MIMO matrices corresponding to unpaired transmitter-receiver circular polarization modes. This estimation process represents on its-self a multipath filtering since a circular polarization mode can not change when transmitted through a line of sight (LOS) even if the transmitter and the receiver are mi-oriented relatively to each other.

LOS sub-channel filtering by removing the multipath contribution on the co-polarized MIMO matrices that are estimated on a link presenting in which the polarizations at the transmitter and at the receiver sides are the same. The filtering process can not be realized naturally as in the NLOS case, it is why the filtering is realized by an algorithm.

Estimation independently of the localization and orientation of groups of nodes which can not be separated in time using timing synchronization.

Estimation of the two cross-polarized MIMO matrices corresponding to unpaired circular polarizations and two co-polarized MIMO matrices corresponding to two unpaired circular polarizations.

Space-time-polarization using polarization space time bloc codes intended to realize a first filtering step in time domain in one hand and to estimate the above four MIMO matrices on the other hand.

Direction of arrival (DOA), tilt angle of oncoming wave (TAON), direction of departure (DOD) and tilt angle of outgoing wave (TAOUT) estimation using the estimated polarized MIMO matrices.

Improvement of high resolution algorithms such MUSIC or the MVR by combining their relative multiple polarization dependent spatial spectra.

Location and orientation finding sub-system when no line of sight is available between the positioning radio station and the object that is subject to location and orientation operation. This sub-system is also useful for technology limited radio stations with which neither MIMO nor multi polarization operations can be conducted. It has to be noted also that in the path loss based localization methods, the problem of non-isotropic antennas poses a serious problem since it causes an erroneous estimation of the distances between the nodes. The reason stems from the fact that the final path loss is proportional to both the gain of the transmitting antenna and the gain of the receiving antenna. The gains also dependent upon the orientation of antennas. This makes it difficult to correct from the anisotropies effect through a simple gain equalization. The proposed sub-system is also a solution to these specific problems.

An important aspect of the invention is the possibility to use the filtered co-polarized MIMO matrices to transmit information requiring a low bit error rate and to use cross-polarized matrices for information demanding a less quality.

It must be noted that an adapted filtering of reflected waves is performed in a way which improves the natural filtering provided by the polarization itself.

BRIEF DESCRIPTION OF THE DRAWINGS

The present invention will now be described, by way of examples, with reference to the accompanying drawings wherein.

DESCRIPTION OF THE PREFERRED EMBODIMENTS

Figure 1A:
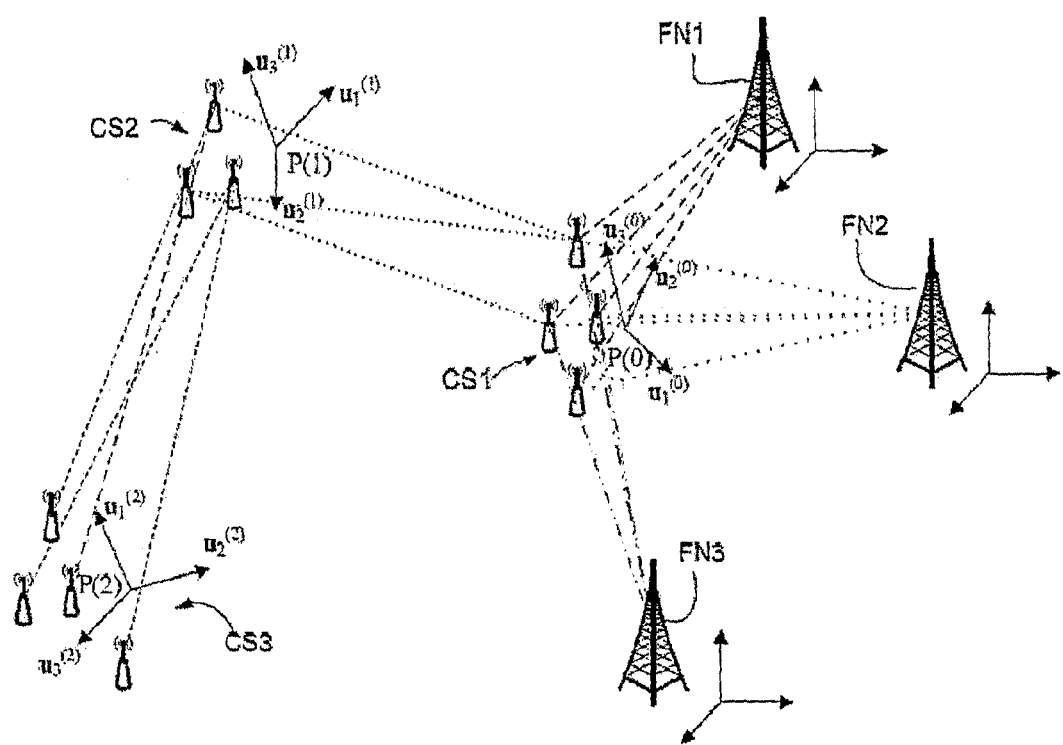
FIG. 1a shows the wireless sub-system in which MIMO system with polarization diversity capability can be applied.

FIG. 1a is an example of location and orientation subsystem in which the combined spatial diversity and polarization diversity can be used. It comprises a lot of clusters of sensors CS1, CS2, CS3 . . . and a lot of fixed nodes FN1, FN2, FN3. The aim of the invention is to find the orientation and the localization of every node and cluster considered from any cluster or fixed nodes. In this FIG. 1a, reference systems $u_1^{(1)} u_2^{(1)}$, $u_3^{(1)}$, $u_1^{(2)} u_2^{(2)}$, $u_3^{(2)}$, $u_1^{(3)} u_2^{(3)}$, $u_3^{(3)}$ having respectively the origins P(0), P(1), P(2) . . . are allocated to clusters CS1, CS2, CS3 . . . . These reference systems can move relative to the reference system of the fixed nodes FN1, FN2, FN3, . . . .

Figure 1B:
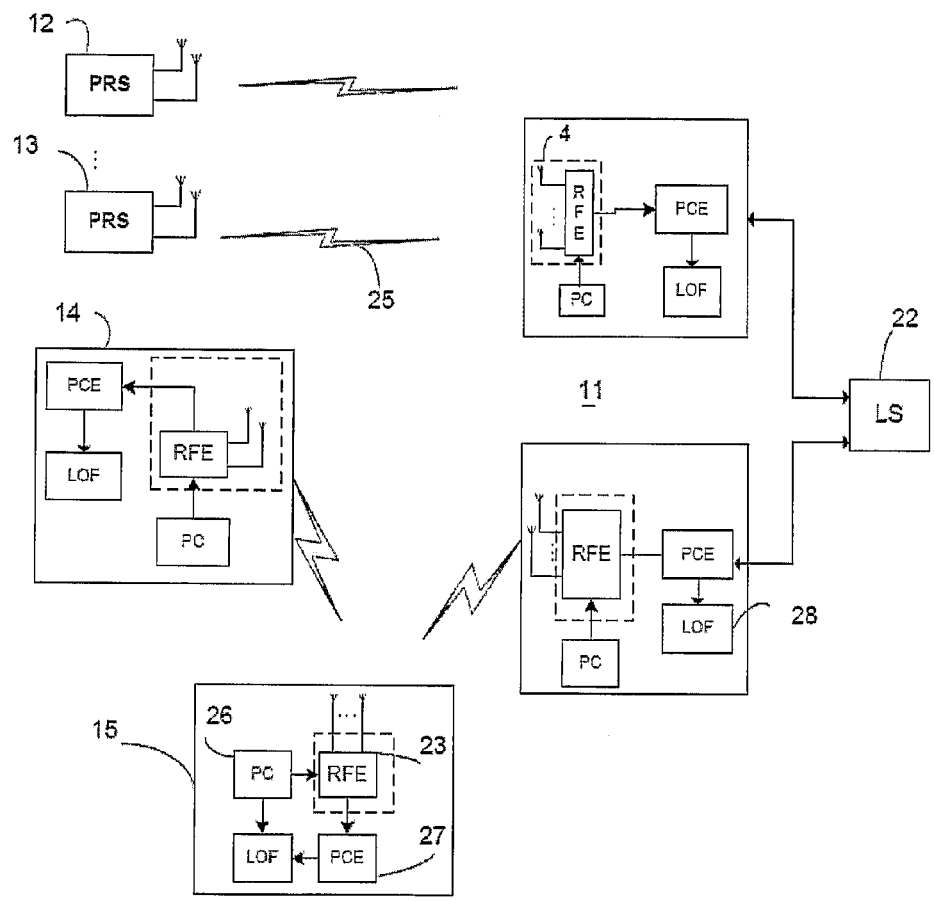
FIG. 1b presents a block diagram corresponding to the location and orientation estimation MIMO and polarization based sub-system according to the invention.

FIG. 1b shows some details of the radio set incorporated in the mentioned clusters and fixed nodes. It comprises a set of orientation radio stations 11, 12, 13, 14 sharing location and orientation (LO) information through a location server (LS) 25. All said stations 11, 12, 13, 14 can have the same structure. Only in FIG. 1b, the station 11 is shown in more detail. The radio part of this station (PRS) is composed of a radio front end (RFE) 23 for analog high frequency modulation and filtering and a controllable polarized radio structure (CPRS) able to transmit or to receive at any time electromagnetic right hand circular polarization (RHCP) or left hand circular polarization (LHCP) waves 25. The base band part of the PRS comprises a polarization controller (PC) 26 capable of selecting the polarization state (RHCP or LHCP) of any group of antennas inside the CPRS, a MIMO polarized channel estimation (PCE) module 27, and a location and orientation finder (LOF) 28.

Figure 1C:
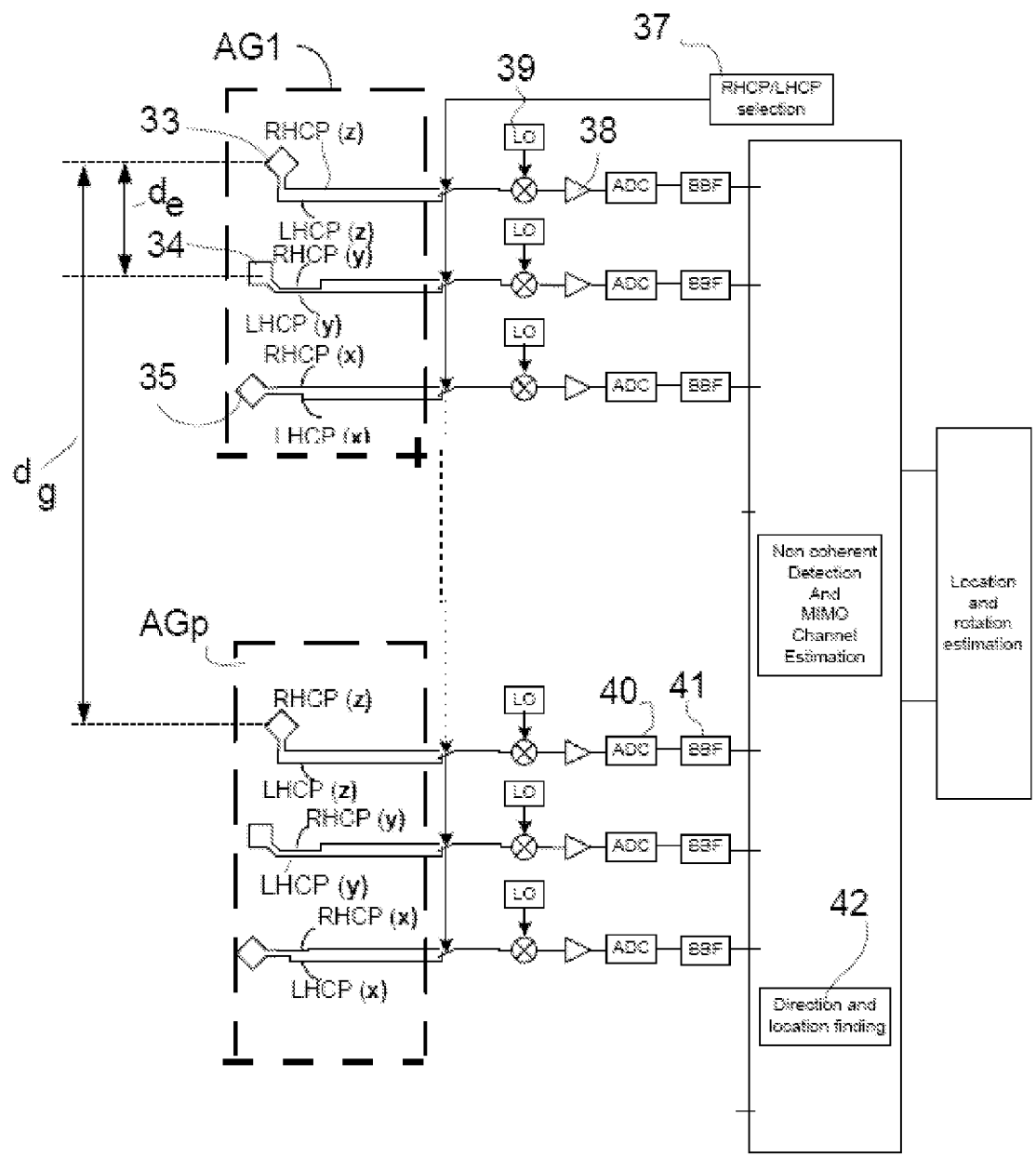
FIG. 1c is a block diagram showing an example of a radio front end that may be used according to the invention.

FIG. 1c is a more explicit scheme of the device 11. It comprises banks of group antennas AG1, . . . , AGg able to receive various polarized waves. Each bank is composed of one or several groups of three circular polarized antennas. For instance the bank AG1 comprises at least three antenna elements 33, 34 and 35. The antenna elements within each group are oriented following three axes. The unit basis vectors x, y, and z describing the orientation of these axes form a basis of dimension one, two or three. A three dimensions of such basis and a perfect orthogonality between these unit vectors is preferred while difficult to achieve in practice. In the latter case, the radio system at the transmitter and at the receiver antenna arrangement is said to use a complete polarized system allowing the radiation or the retrieval of the Left Right Hand Circular Polarization (LHCP) or the Right Hand Circular Polarization (RHCP) respectively.

When used in a linear antenna array configuration the structure along a given axis is repeated periodically while keeping a constant inter-element spacing $d_e$ inside the same group and a constant inter-group spacing $d_g$. By construction, there is no correlation or coupling between the antenna elements belonging to different groups if the distance $d_g$, is a multiple of the half wave length.

The antenna arrangement at the transmitter and at the receiver sides allows forming a polarized MIMO system in which the completeness of the radio structure and the orthogonality between the LHCP and the RHCP signals is conserved through a completeness and the orthogonality between the composed beamformers.

FIG. 1c shows a polarization mode selection module 37 choosing the polarization to receive at a given time when no hardware resources are available to achieve parallel detection of all polarization modes. The main RF components of the radio front end consisting of the low noise amplifier 38, a local oscillator 39, an analog to digital converter 40 and a base band shaping filter 41 are also presented.

FIG. 1c also depicts the interconnection between the radio front end and the main base band modules realizing non coherent detection of the pilot symbols, channel estimation and location-orientation finding 42.

Figure 1D:
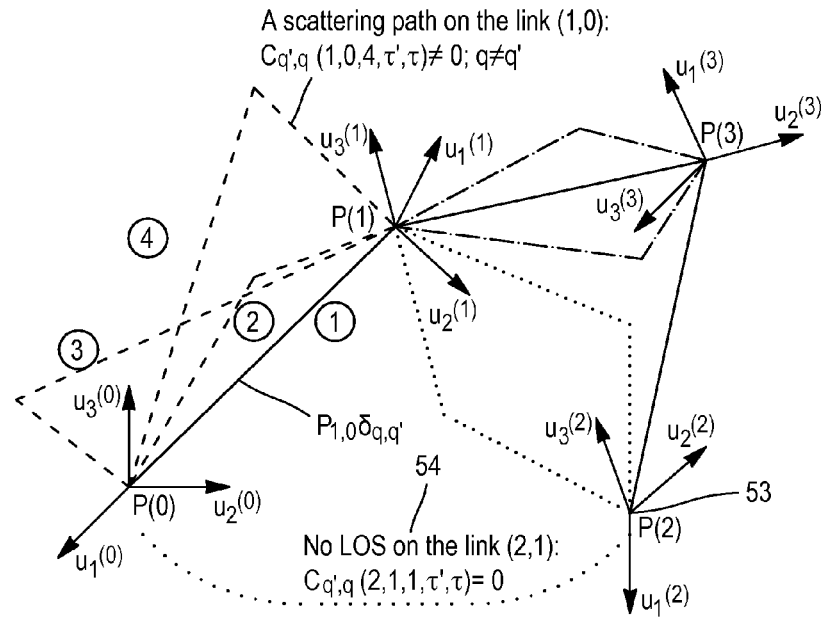
FIG. 1d presents the effect of the multipath channel on the transmitted waves and the mis-orientation between the mobile nodes in the network.

FIG. 1d shows a schematic representation for an example of multi-path propagation. It shows some nodes P(0), P(1), P(2) and P(3). The references Pth1, Pth2, Pth3 and Pth4 indicate some propagation paths between nodes P(0) and P(1). It must be noted there is no direct link between the nodes P(0) and P(2). For each of these nodes, a coordinate system is attached so that, all orientations and localization parameters, which are evaluated are referenced to this local coordinate system. This FIG. 1d depicts a schematic representation of the multipath radio channel and the mis-orientation 53. The representation shows that LOS do not usually exist for all couples of nodes and that in such a situation the orientation of a node relatively to another could be calculated using the ad hoc mode 54. The wide band (WB) channel response of any link (l', l) is represented by a $Mr^{(q')} \times Mt^{(q')}$ MIMO channel matrix corresponding to the link (l', l) when the node (l') is receiving on the polarization state q a and a the node (l) transmitting on the polarization state q. Such a matrix is given by:

$$H_{q',q}(l'; l, \tau^{(l',l)}) = \sum_{i=1}^{i=L(l,l')} H_{q',q}(l'; l, i)\delta(\tau^{(l',l)} - \tau_i^{(l,l')}) \quad (1)$$

where:

$$H_{q',q}(l'; l, i) = a_{q'}(l', \Omega_i^{(l,l')})C_{q,q'}(l', l, i)e^{-jk\gamma_{l',l}}a_q^H(l, \Psi_i^{(l,l')}) \quad (2)$$

$a_q(l', \Omega_i^{(l,l')})$ (respectively, $a_q(l, \Psi_i^{l,l'})$) is the steering vector at the receiver (respectively transmitter) side. The superscript H means the Hermitian conjugate.

The symbol $\gamma_{l',l}$ denotes the tilt angle. The time variable $\tau_i^{(l',l)}$ comprises both the synchronous delay between the nodes l and l' and the traveling time of the wave i. $C_{q',q}(l',l,i)$ is a complex number denoting the channel gain along the path i and corresponding to a transmitted polarization state q' and a received polarization state q. Along the LOS of the link (l', l), the channel gains have the property, $$C_{q',q}(l',l,i,\tau',\tau) = p_{l',l}\delta_{q,q'} \quad (3)$$

where $p_{l',l}$ is a complex path loss factor depending on the distance between the two nodes and $k=(2\pi/\lambda)$ It is assumed a LOS exists on the link (l, l') then the orientation of the node (l') relatively to the node (l) is fully described by the Wigner matrix:

$$D^1(\alpha^{(l,l')},\beta^{(l,l')},\gamma^{(l,l')}) = D^1(\phi^{(l)}_1,\theta^{(l)}_1,0)^H D^1(\phi^{(l')}_1, \theta^{(l')}_1,\gamma^{(l,l')}) \quad (4)$$

Where $\alpha^{(l,l')}$, $\beta^{(l,l')}$ and $\gamma^{(l,l')}$ are the correspondent Euler angles.

The antenna arrangement at the transmitter and at the receiver sides allows forming a polarized MIMO system in which the completeness of the radio structure and the orthogonality between the LHCP and the RHCP signals is conserved through completeness and an orthogonality between the composed beamformers. The steering vector for a group of antennas along an axis for a given polarization state (RHCP or LHCP) q is given by:

$$a_g(q,\Omega)=D_g(d,\Omega)p_g(q,\Omega) \quad (5)$$

Where:

$$D_g(q,\Omega)=\text{diag}(e^{jke_0(\Omega)\cdot h_1^g}, e^{jke_0(\Omega)\cdot h_2^g}, e^{jke_0(\Omega)\cdot h_3^g}) \quad (6)$$

$p_g$ is a polarization dependent steering vector. For a small dual electric-magnetic dipole, this steering vector is up to a constant complex scalar dipole given by $$p_g(q,\Omega)=(\hat{z}\cdot\bar{e}_q(\Omega),\hat{x}\cdot\bar{e}_q(\Omega),\hat{y}\cdot\bar{e}_q(\Omega))^T \quad (7)$$

The q index in $D_g(q,\Omega)$ is to remember that a group of antenna g can be dedicated exclusively to a fixed polarization state q. This might be the case when the antenna structure is that of a base station with no size constraint. The index q may be omitted if the same antenna group is used by either the RHCP or the LHCP antenna after the group switch is turned on the polarization state q under the action of the PC.

The steering vector of the whole set of antennas is given by $$a(q,\Omega)=(a_1(q,\Omega)^T, \ldots, a_G(q,\Omega)^T)^T \quad (8)$$

Figure 1E:
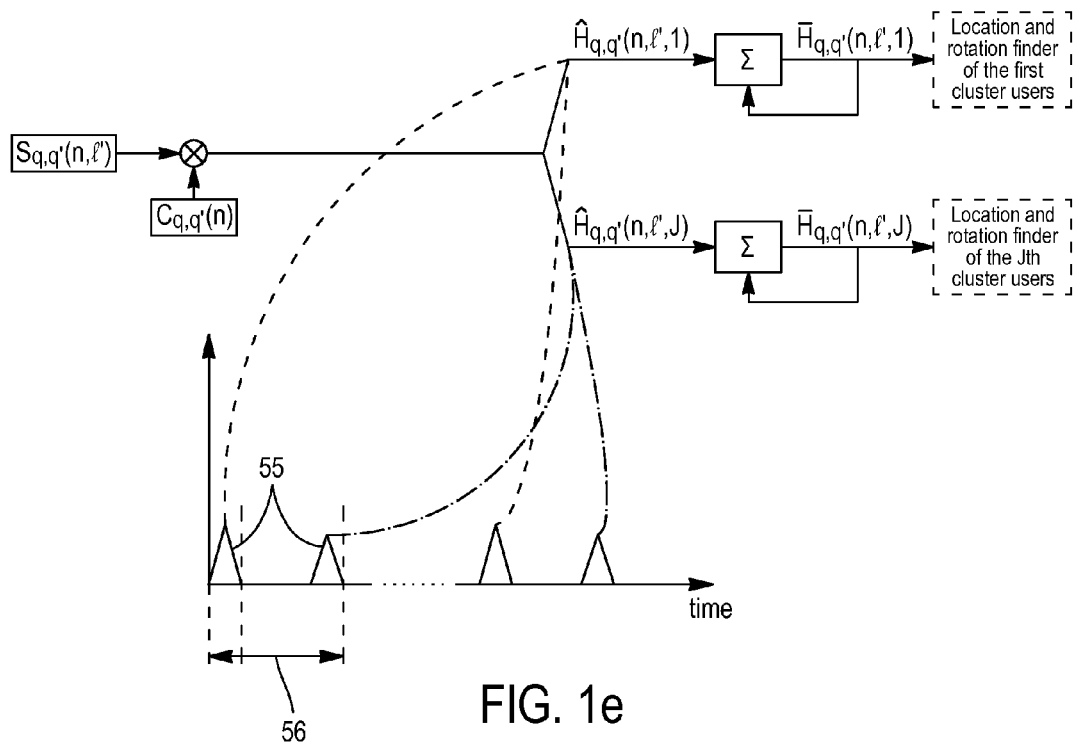
FIG. 1e presents the principle of user clustering and signal detection.

FIG. 1e presents a procedure for mobile nodes clustering at the synchronization stage. The multiuser MIMO network seen by any receiver 1' is composed of a set of nodes indexed by $l=1, \ldots L$ and transmitting signal at time symbols nT. These nodes are separated by the synchronization module of the receiver into a finite number of clusters 55. Each cluster represents a finite number of transmitters, the first time of arrivals (TOA) of the waves transmitted by the nodes belonging to a same cluster fall at the receiver side during the same time symbol 56. For L nodes belonging to a given cluster, the received MIMO signal matrix on the polarization state q when the polarization state q' is transmitted by all cluster nodes is given by $$S_{q,q'}(l',n) = \sum_{l,i} H_{q',q}(l';l,i)C_{q,q'} + Z_{q,q'}(n) \quad (9)$$

Where the sampling gain due to the TOA difference between the L users inside the same time symbol and due to the filtering gain is assumed to be part of the channel coefficient gains. In this expression $Z_{q,q'}(n)$ is a $(Mr^{(q)}\times N)$ noise matrix resulting from the multipath interfering signals and the thermal noise. $C_{q,q'}$ are the pilot blocs that might be taken from a complementary code set with periodic out-of-phase correlation functions having the property:

$$C_{q,q'}{}^H\Delta(\tau)C_{q,q'}=T\delta_{\tau,0}I_{Mr^{(q)}} \quad (10)$$

Where $\Delta(\tau)$ is the shifting operator that delays any repeated code of the matrix $C_{q,q'}$ by $\tau$ symbols and $I_{Mr^{(q)}}$ is the $Mr^{(q)}\times Mr^{(q)}$ identity matrix.

A pilot channel dedicated to broadcast the information is needed for the estimation of the MIMO channel parameters. Depending on how voluminous the multiple antenna structure is, two signaling schemes may be used:

A mono-mode signaling scheme in which each transmitter is allowed to transmit during a specific time interval a training sequence intended to estimate one of the 4 bi-mode channel matrices $H_{q,q'}$.

A bi-mode signaling scheme in which each transmitter sends two symbol blocks in parallel so the receiver can estimate two bi-mode channel matrices during the same time interval.

The pilot channel of A MIMO system equipped with co-located electric and magnetic antennas and using a signaling schemes between this kind of antennas can be described by the signal $C_{p,p'}$ transmitted by the pilot channel where p (respectively. p') is an index used to characterize the type of polarization used at the receiver side (respectively. transmitter side). A convention identifying the polarization state of a set of N antennas is adopted according to:

$$p = \sum_{n=0}^{n=N-1} p_n 2^n \quad (11)$$

Where $p_n$ is the polarization state of the antenna number n taking the value 0 if the antenna n is on the polarization state 0 (electrically polarized or right hand circularly polarized) and the value $p_n=1$ if the antenna is on the polarization state 1 (magnetically polarized or left hand circularly polarized).

The cases of interest correspond to the case of similarly polarized antennas. In such a case p=0 if all the N antennas are either electrically polarized or right hand circularly and $p=2^N-1$ if all antennas are magnetically polarized or left hand circularly polarized. When such cases of interest are only considered, it may be made use of the light notation p=q=−1 instead of p=0 and p=1 instead of $p=2^N-1$.

To distinguish the case of MIMO channel response between electric-magnetic polarized antennas from the case of a MIMO channel response between circular polarized antennas, the MIMO channel response in the first case is denoted by H' and the MIMO channel response in the second case by H. When electric-magnetic polarized antennas are used at both sides of the connections, the received signal matrix on the polarization state p when the polarization state p' is transmitted by all cluster nodes is given in this case by $$S'_{p,p'}(l',n) = \sum_{l,i} H'_{p',p}(l';l,i)C_{p,p'} + Z_{p,p'}(n) \quad (12)$$

Where $Z_{p,p'}$ is an additive noise.

By using the light notation convention, a correspondence can be established between the MIMO channel response of the two kinds of polarization as follows:

$H_{-1,-1}(1',1,i)=0.5(H'_{-1,-1}(1',1,i)+H'_{1,1}(1',1,1i))+0.5j(H'_{-1,1}(1',1,i)-H'_{1,-1}(1',1,i))$ $H_{1,1}(1',1,i)=0.5(H'_{-1,-1}(1',1,i)+H'_{1,1}(1',1,1i))-0.5j(H'_{-1,1}(1',1,i)-H'_{1,-1}(1',1,i))$ $H_{-1,1}(1',1,i)=0.5(-H'_{-1,-1}(1',1,i)+H'_{1,1}(1',1,1i))+0.5j(H'_{-1,1}(1',1,i)+H'_{1,-1}(1',1,i))$ $H_{1,-1}(1',1,i)=0.5(-H'_{-1,-1}(1',1,i)+H'_{1,1}(1',1,1i))-0.5j(H'_{-1,1}(1',1,i)+H'_{1,-1}(1',1,i))$

These transformations can be used to estimate circular polarized MIMO channel matrix from the electric-magnetic polarized one. The electric-magnetic channel responses can be estimated at different time intervals using a convenient time polarization diversity at the transmitter side along the pilot channel.

The channel estimation module intended to remove the symbol blocs is used prior to the location finding process, the symbols are removed by the maximum-likelihood detector.

The resulting said cross-polarized channel matrices are characterized by different transmitted and received polarization states (q=−q'). They are given by $$\hat{H}_{q,-q}(n,l',j) = A(q,\Omega_s) P_{q,-q}^{(s)} A(-q,\Psi_s)^H + N_{q,-q}(n) \quad (13)$$

The resulting said co-polarized MIMO matrices are characterized by similar transmitted and received polarization states (q=q'). The co-polarized MIMO matrices are given by:

$$\hat{H}_{q,q}(n,l',j) = A(q,\Omega^{(d)}) P^{(d)} \Gamma^{(d)} A(q,\Omega^{(s)}) P_{q,q}^{(s)} A(q,\Psi^{(s)})^H + N_{q,q}(n) \quad (14)$$

Where $N_{q,q}(n)$ are zero mean and normally distributed variables with a covariance matrix R. Matrix $A(q,\Omega) \equiv (a(q, \Omega_1), \ldots, a(q,\Omega_L))$ denotes the steering matrix in the look directions $\Omega = (\Omega_1, \ldots, \Omega_L)^T$. $P^{(d)}$ is a diagonal matrix containing the complex channel gains of the LOS waves and $P^{(s)}_{q,q'}$ is the matrix containing the complex channel gains of the multipath waves and $\Gamma^{(d)} = \text{diag}(e^{-jq\gamma_1}, \ldots, e^{-jq\Psi_L})$ is a diagonal matrix giving the tilt diagonal matrix at the transmitter side.

If channel reciprocity is verified the channel matrix gain along the multipath can be written as follows:

$$P_{q,q'}^{(s)} = P_{cop}^{(s)} \Gamma_{cop}^{(s)q} \delta_{q,q'} + P_{cr}^{(s)} \Gamma_{cr}^{(s)q} \delta_{q',-q} \quad (15)$$

Where ($P^{(s)}_{cop}$ resp. $P^{(s)}_{cr}$) is the matrix containing the complex channel gains of the multi-paths when the polarization states at the transmitters at the receiver are similar (respectively different), $\Gamma_{cop}^{(s)} \Gamma_{cr}^{(s)}$ are two diagonal matrices. Such identity guaranties the power conservation property along the reciprocal channel, i.e.

$$P_{-1,1}^{(s)} \circ P_{-1,1}^{(s)H} = P_{1,-1}^{(s)} \circ P_{1,-1}^{(s)H} \text{ and } P_{-1,-1}^{(s)} \circ P_{-1,-1}^{(s)H} = P_{1,1}^{(s)} \circ P_{1,1}^{(s)H}.$$

Figure 1F:
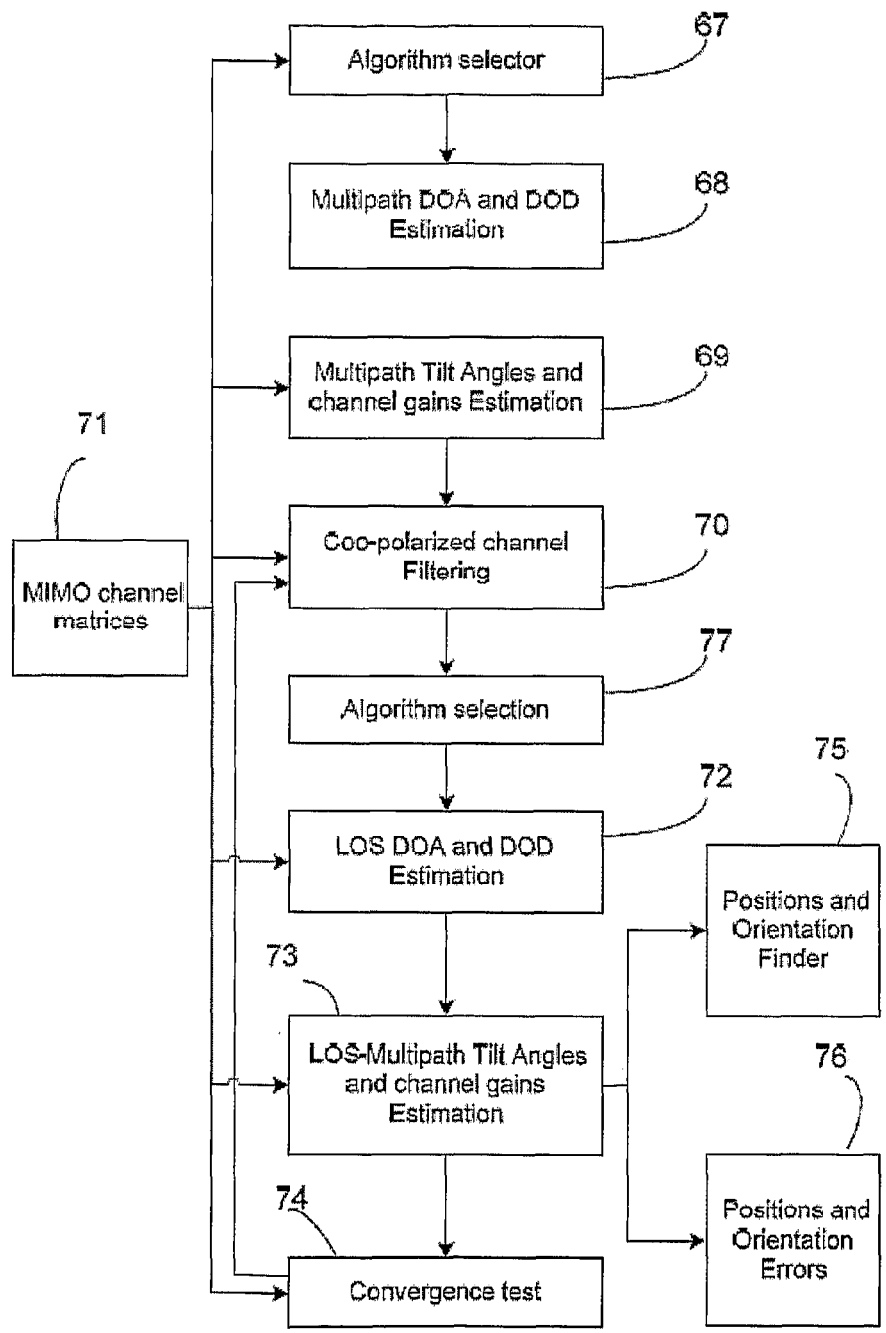
FIG. 1f represents a high level description of the iterative location orientation process highlighting the space detection and the channel filtering blocs.

Referring to FIG. 1f, the robust location and orientation finder relatively to each cluster is composed of the following modules:

An algorithm selector module 67 that selects of the best estimation method based on information collected about the channel matrices ranks on the cross-polarization mode.

And internal system information such as the software and hardware available resources.

Thus if the channel numerical resources are available, the ML estimation method might be selected. This method consists of finding the maximums of the scaled likelihood function $$(\Omega_{ML}, \Psi_{ML}, \Gamma_{ML}) = \arg\max_{\Omega,\Psi,\Gamma} f(\Omega, \Psi, \Gamma)^H C^{-1} f(\Omega, \Psi, \Gamma) \quad (16)$$

Where f is the vector with a size equal to the number of multipath waves and with components $$(f(\Omega, \Psi, \Gamma))_m = \left( \sum_{q=-1,+1} (A(q,\Omega_l)^H \overline{H}(q) B(-q,\Psi) \Gamma^{-q})_{m,m} \right) \quad (17)$$

C is a $L^{(s)} \times L^{(s)}$ matrix given by:

$$C(\Omega, \Psi, \Gamma) = \sum_{q=-1,+1} \Gamma^{-q}(A(q,\Omega)^H A(q,\Omega)) \cdot \overline{(A(-q,\Psi)^H A(-q,\Psi))} \Gamma^{-q} \quad (18)$$

The ML estimate of the channel coefficients diagonal matrix $P^{(s)}_{cr}$ is given by:

$$\hat{P}_{cr}^{(s)}(\Omega_{ML}, \Psi_{ML}, \Gamma_{ML}) = C^{-1}(\Omega_{ML}, \Psi_{ML}, \Gamma_{ML}) f(\Omega_{ML}, \Psi_{ML}, \Gamma_{ML}) \quad (19)$$

Since the ML estimation method requires huge computational resources, the MUSIC and the MV based methods can be used instead. A disclosure describing the MUSIC algorithm can be found at:

R. O. Schmidt, "Multiple Emitter Location and Signal Parameter Estimation", IEEE Trans. Antennas Propagat., Vol. AP-34, No. 3, pp. 276-280, March 1986

And the describing of MV algorithm:

J. Capon, "High-Resolution Frequency—Wavenumber Spectrum Analysis," Proceedings of the IEEE, Vol. 57, pp. 1408-1418 (1969).

The MUSIC algorithm is selected if averaged channel matrices on the cross-polarization modes are both rank deficient while the MVR algorithm is selected if these matrices are full rank. $R_{cr}$ denotes the common rank of these matrices which is chosen as the minimum of the ranks of the two matrices.

A multipath DOA (direction of arrival) and DOD (direction of departure) estimation module 68 achieving the estimation of the directional parameters at the transmitter and at the receiver side based on the last selection method procedure.

A multipath Tilt angles and channel gains estimation module 69 using the estimated AOA (angle of arrival) and AOD (angle of departure) as a priori information and estimates the channel gains on each path as well as the tilt angles whenever the reciprocity channel is verified on any of these paths. Indeed, since the DOA and the DOD of the multipath are in general the same for all polarization modes, the co-polarization modes are used to estimate the AOA, AOD tilt angles and channel gains of the LOS together with the channel gain of the multipath. The tilt angles, DOA, DOD of the multipath already estimated on the cross polarization modes are used as a priori information to filter the multipath components and enhance the global signal to interference ratio on the co-polarization modes. They do not need to be re-estimated in the robust version of the algorithms. This module has also a pairing function aiming to find, for each estimated DOA couple of angles, the DOD couple of angles so that the paired DOA/DOD parameters describe the directional properties of a particular path at both end of the transmitter-receiver link.

A Co-polarized channel filtering module 70 that removes the multipath channel components from the co-polarized MIMO matrices using the DOA, DOD estimates and the channel gains estimates together with the known MIMO matrices 71.

A LOS DOA and DOD estimation module 72 intended to estimate the AOA and the AOD along the LOS using the filtered co-polarized channel matrices.

A LOS-Multipath tilt angles and channel gains estimation module 73 that uses the already estimated DOA and DOD of the multipath and the LOS as a priori information to deliver estimates of the channel gains and the tilt angles of both the LOS and the multipath on the co-polarized MIMO channel.

The module uses also channel reciprocity information about any multipath wave in order to refine the channel gain estimates.

A convergence test module 74 that examines a metric calculated from the different estimates. If the convergence is achieved, the estimated tilt angles, DOA and the DOD are transmitted to the orientation location finder 75. Orientation is determined by computing the Wiper rotation matrix (equation 4). Localization is computed by using the pair azimuth and elevation angles together with the arrival times. Otherwise, the new estimated parameters are used as a priori information in the co-polarized channel filtering module to refilter the multipath components and achieve better estimates of the directional parameters.

An expected error estimator module 76 that gives the expected errors on the location and the orientation based on the SNR and channel condition.

A high rank MVR based algorithm uses jointly all polarization modes to estimate the LOS and the multipath parameters. Such an algorithm might be used when the number of multipath waves is high but when the power is much less than the LOS waves.

Figure 1G:
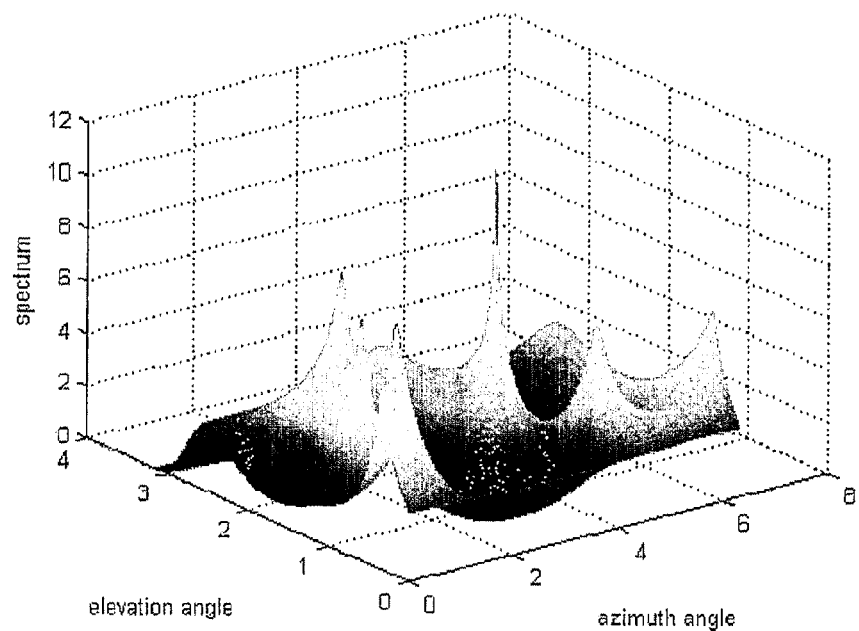
FIG. 1g shows the angle of arrival spectrum without channel filtering.

FIG. 1g shows an example of DOA spectrum found without any multipath filtering. The logarithm scaling of the spectrum is used to distinguish clearly the space variation of the spectrum. There are two users in the LOS of the transmitter and a multipath channel with waves as strong as the LOS themselves. The algorithm fails to find any of the two users.

Figure 1H:
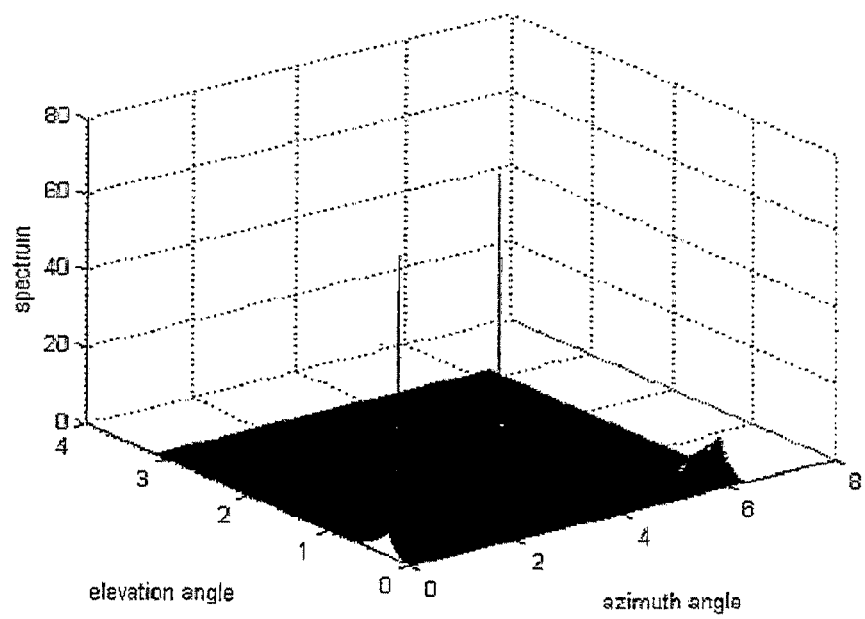
FIG. 1h shows the angle of arrival spectrum after filtering of the multipath components.

FIG. 1h shows the DOA spectrum found after three iterations only. The two users are now clearly identified and the algorithm can stop after these few iterations.

Figure 1I:
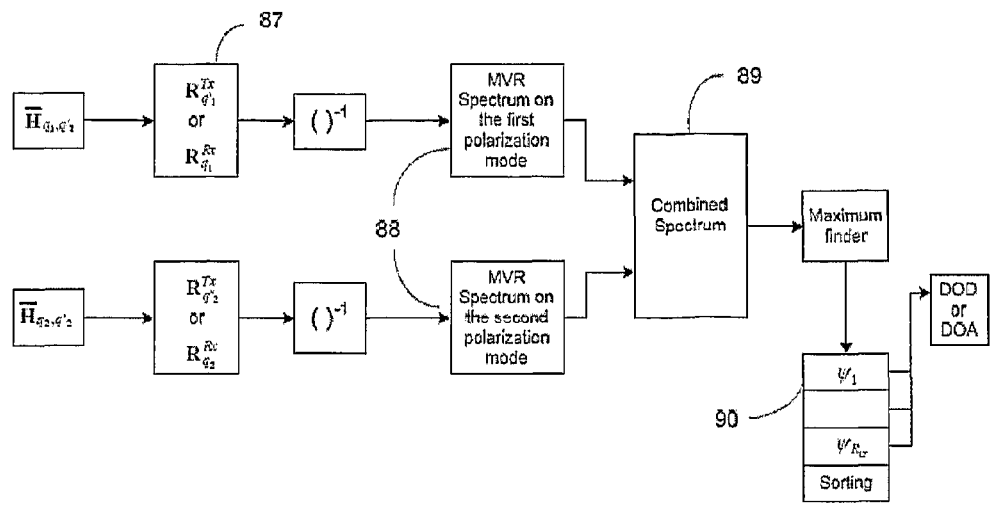
FIG. 1i shows the main components of the minimum variance detection algorithm.

FIG. 1i shows a diagram of the spectrum product based on the MVR algorithm.

The algorithm makes use of two correlation matrices obtained respectively by a self correlation of two matrices corresponding each to a particular polarized MIMO channel. Thus, if the polarization modes are $(q_1, q'_1)$ and $(q_2, q'_2)$, the correlation matrices are either the receive correlation matrix $R_{q_1}^{Rx} = \overline{H}_{q_1,q'_1} \overline{H}_{q_1,q'_1}^H$ or the transmit correlation matrix $R_{q'_1}^{Tx} = \overline{H}_{q_1,q'_1}^H \overline{H}_{q_1,q'_1}$. The transmit correlation matrix is used to estimate the channel parameters at the transmitter side, namely the set of AOD, and the tilt angles while the receive correlation matrix is used to estimate the set of AOA.

To estimate the multipath DOA, DOD and tilt angles, the polarization modes $(q_1, q'_1)=(-1, 1)$ and $(q_2, q'_2)=(+1, -1)$ are used. The co-polarization modes $(q_1, q'_1)=(-1, -1)$ and $(q_2, q'_2)=(+1, +1)$ are used when both the LOS DOA, DOD and tilt angles and the multipath channel gains on the co-polarization modes are estimated.

The correlation matrices are either "receive correlation matrices" or "transmit correlation matrices" 87. The couples of "receive correlation matrices" are respectively given by $R_{q_1}^{Rx} = \overline{H}_{q_1,q'_1} \overline{H}_{q_1,q'_1}^H$ and $R_{q_2}^{Rx} = \overline{H}_{q_2,q'_2} \overline{H}_{q_2,q'_2}^H$ while the couple of "transmit correlation matrices" are given by $R_{q'_1}^{Tx} = \overline{H}_{q_1,q'_1}^H \overline{H}_{q_1,q'_1}$ and $R_{q'_2}^{Tx} = \overline{H}_{q_2,q'_2}^H \overline{H}_{q_2,q'_2}$ In a second step, the standard MVR algorithm is applied on the two polarization modes to provide either two MVR spectra 88 for DOA or two MVR spectra for DOD. The MVR spectrum on a given $(q_1, q'_1)$ polarization mode is given by $$P_{q_1}^{Rx}(\Omega) = f_H (C_{q_1}^{Rx}(\Omega)_H R_{q_1}^{Rx-1} C_{q_1}^{Rx}(\Omega)) f \quad (20)$$

The constraints on the MVR beam former are expressed through $C_{q_1}^{Rx}(\Omega)^H w_{q_1}^{Rx} = f$ and $C_{q'_1}^{Tx}(\Psi)^H w_{q'_1}^{Tx} = f$. They express both a maximum of power on the polarization mode of interest while looking toward the actual direction DOA or DOD and also a null power on the orthogonal polarization mode, mainly $a(q_1, \Omega)^H w_{q_1}^{Rx} = g$ and $a(-q_1, \Omega)_H w_{q_1}^{Rx} = 0$. Where g is the maximum gain in the look direction $\Omega$.

In a third step, the common MVR spectrum is calculated using the product of MVR spectrum on the two polarization modes 89.

$$P_{q_1}^{Rx/Tx}(\Omega) = P_{q_1}^{Rx/Tx}(\Omega) P_{q_2}^{Rx/Tx}(\Omega) \quad (21)$$

The spectrum addition may be used as well. The advantage of the product is the tighter half power beam width (HPBW) exhibited by the product compared to the sum.

The DOA (or DOD) couples of angles are the first $R_{cr}$ couples of angles corresponding to the values of the local maxima of the common MVR spectrum sorted in descending order 90.

Figure 1J:
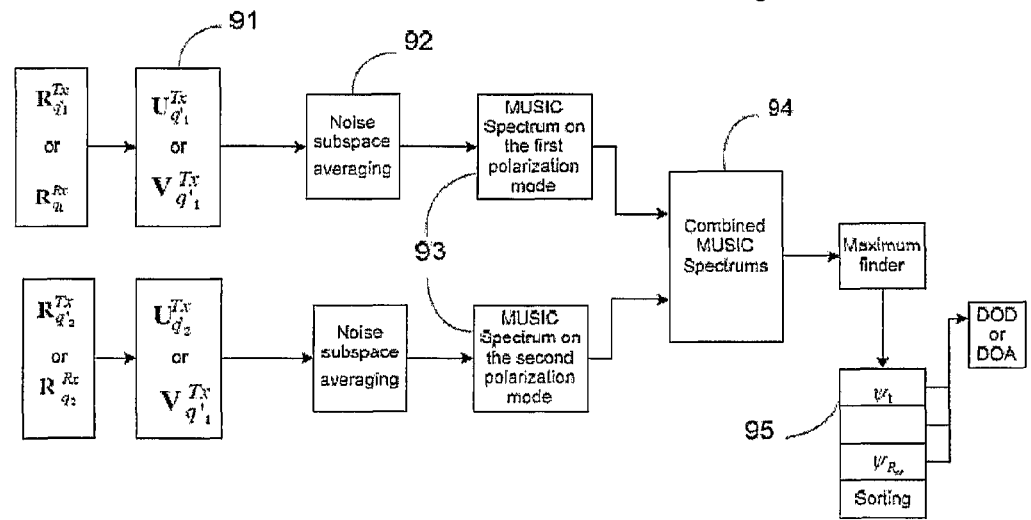
FIG. 1j shows the main components of the MUSIC detection algorithm.

FIG. 1j presents the MUSIC based algorithm. The algorithm makes use of two correlation matrices obtained respectively by a self correlation of two matrices corresponding each to a particular polarized MIMO channel. In a first step the signal space and the noise at the transmitter side are separated 91. Using the commonly used notations the SVD decomposition of the channel matrix on a $(q_1, q'_1)$ polarization mode can be written:

$$\overline{H}_{q_1,q'_1} = [U_{q_1,q'_1}^s ; U_{q_1,q'_1}^n] \begin{bmatrix} S_{q_1,q'_1}^s & 0 \\ 0 & S_{q_1,q'_1}^n \end{bmatrix} \begin{bmatrix} V_{q_1,q'_1}^{sH} \\ V_{q_1,q'_1}^{nH} \end{bmatrix} \quad (22)$$

In particular, the noise space at the transmitter side is used to estimate the DOD while the noise space at the receiver side is used to estimate the DOA. These noises are given respectively by:

$$V_{q_1,q'_1}^n [v_{q_1,q'_1}^n(1), \ldots, v_{q_1,q'_1}^n(M_{Rx}-R_{cr})] \quad (23)$$

And $$U_{q_1,q'_1}^n = [u_{q_1,q'_1}^n(1), \ldots, u_{q_1,q'_1}^n(M_{Rx}-R_{cr})] \quad (24)$$

An average over the noise space 92 components is then obtained through $$E_{q_1,q'_1}^{Tx} = \sum_{i=1}^{i=M_{Rx}-R_{cr}} v_{q_1,q'_1}^n(i) \quad (25)$$

and $$E_{q_1,q'_1}^{Rx} = \sum_{i=1}^{i=M_{Rx}-R_{cr}} v_{q_1,q'_1}^n(i) \quad (26)$$

In a second step, the standard MUSIC algorithm is applied providing two transmit MUSIC spectra 93 $spm_{q_1,q'_1}^{Tx/rx}(\Psi)$ and $spm_{q_2,q'_2}^{Tx/rx}(\Psi)$, or two receive MUSIC spectra $$spm_{q,q'}^{Tx/Rx}(\psi) = \frac{1}{a(q', \psi)^H E_{q,q'}^{nH} E_{q,q'}^n a(q', \psi)} \quad (27)$$

In a third step, the common MUSIC spectrum is calculated using the product of MUSIC spectrum on the two cross polarization modes, as follows:

$$P^{Tx/rx}(\Psi) = spm_{q_1,q'_1}^{Tx/Rx}(\Psi) spm_{q_2,q'_2}^{Tx/Rx}(\Psi) \quad (28)$$

As in the previous case, spectrum addition may be used as well. The advantage of the product, according to an aspect of the invention, is the tighter half power beam width (HPBW) exhibited by the product compared to the sum.

The DOD (or DOA) couples of angles are the first $R_{cr}$ couples of angles corresponding to the values of the local maxima of the common MUSIC spectrum sorted in descending order 94.

Figure 1K:
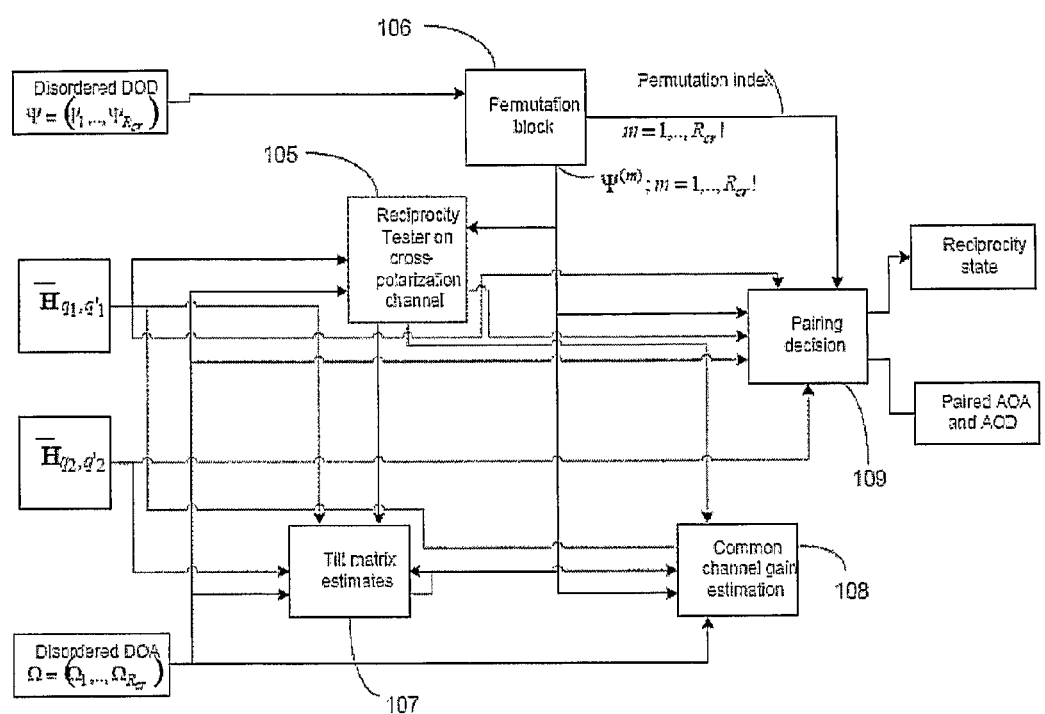
FIG. 1k shows the main components of the pairing algorithm.

FIG. 1k shows the main blocs composing the channel gains estimation modules. When used to estimate the gain of each multi-path, the module realizes an additional task consisting of a test of the channel reciprocity 105. A reciprocity tester which, based on the given AOA and AOD sets and the averaged channel matrices on the cross polarization mode, can check if the complex gains of the channel which are estimated separately correspond to a reciprocal channel or not. The channel reciprocity tester gives a first estimation of the two diagonal matrices $\hat{P}_{q_1 q'_1}^{(m)}$ and $\hat{P}_{q_2, q'_2}^{(m)}$ through $$\hat{P}_{q,q'}^{(m)} = \text{diag}((A(q,\Omega)^H A(q,\Omega))^{-1} A(q,\Omega)_H \\ \overline{H}_{q,q'} A(q',\Psi^{(m)})(A(q',\Psi_{(m)})^H A(q',\Psi^{(m)}))^{-1}) \quad (29)$$

A metric is then used to evaluate the distance between the calculated diagonal matrices. A straightforward way is to use the relative error:

$$\varepsilon_{rec} = \frac{tr(\hat{P}_{q_1,q'_1}^{(m)} - \hat{P}_{q_2,q'_2}^{(m)})(\hat{P}_{q_1,q'_1}^{(m)} - \hat{P}_{q_2,q'_2}^{(m)})^H}{tr(\hat{P}_{q_1,q'_1}^{(m)} \hat{P}_{q_2,q'_2}^{(m)H})} \quad (30)$$

If the error is lower than a fixed small value, the channel is reciprocal and better estimates of the two diagonal matrices $\hat{P}_{q_1,q'_1}^{(m)}$ and $\hat{P}_{q_2,q'_2}^{(m)}$ can be provided by estimating separately the tilt matrix $\Gamma_{cr}^{(m)}$ 107 and the diagonal common channel gain matrix 108 $P_{cr}^{(m)}$ according to $$(\hat{\Gamma}^{(m)})_{l,l} = \exp\left( j \left( \frac{\arg(\hat{P}_{q_1,q'_1}^{(m)})_{l,l} + \arg(\hat{P}_{q_2,q'_2}^{(m)H})_{l,l}}{2} \right) \right) \quad (31)$$

$$\hat{P}_{cr}^{(m)} = \frac{\hat{\Gamma}^{(m)H} \hat{P}_{q_1,q'_1}^{(m)} + \hat{\Gamma}^{(m)} \hat{P}_{q_2,q'_2}^{(m)}}{2} \quad (32)$$

And $$\hat{P}_{q_1,q'_1}^{(m)} = \hat{\Gamma}^{(m)} \hat{P}_{cr}^{(m)}$$
$$\hat{P}_{q_2,q'_2}^{(m)} = \hat{\Gamma}^{(m)H} \hat{P}_{cr}^{(m)} \quad (33)$$

The other blocs composing this module are the following:
A permutation block 106 generating all possible permutations of the set of AOD pairs $\Psi = (\Psi_1, \ldots, \Psi_{R_{cr}})$.
A pairing decision module 109, whose task is to combine an AOD at each AOA. Indeed, the angles of arrivals and departures are estimated in an independent manner. The pairing reconstitutes the physical path as seen by the transmitter and receiver. The pairing operation is based on the optimization of given criteria. Examples of such criteria are the maximization of the log likelihood function or the minimization of the distance between the reconstructed channel matrix and the actual noisy one.

Figure 2:
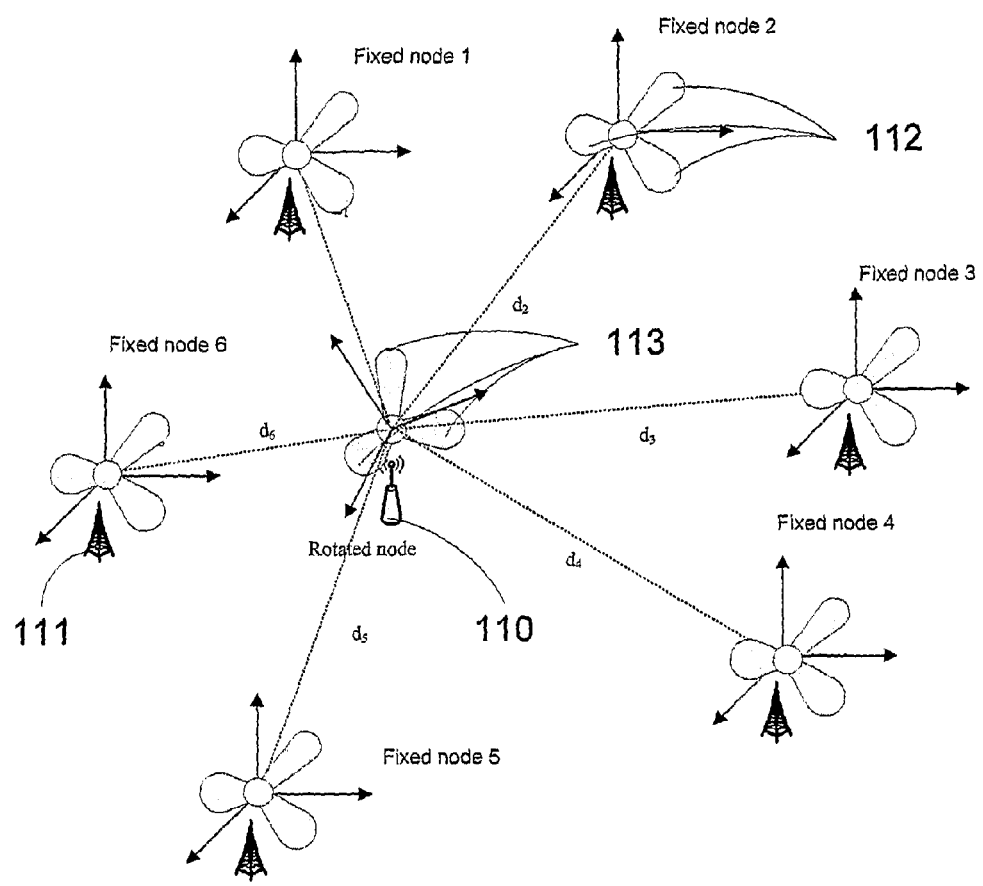
FIG. 2 shows a location and orientation finding sub-system in which single antennas with non isotropic gains are used on each object that is subject to the location and orientation finding operation.

The filtering process has allowed to separate the channel matrices $H_{q,q'}$ into a LOS and a NLOS matrices. The AOA along the LOS can be considered fixed during at least one frame and the AOA along the NLOS are less stationary, however one can keep them fixed during at least one frame. On the other side, the other parameters are varying due to the environment change and need to be re-estimated. This gives a method of simplification of the orientation-location detection algorithm at a fixed station side. FIG. 2 is an example of the sub-system in which single antennas with non isotropic gains are used on each node 110 (rotated node in the FIG. 2) that is subject to location and orientation finding operation. In particular:

This sub-system takes advantage of antenna angular power gain profile to improve the trilateration location methods.

This sub-system takes advantage of antenna angular power gain profile to provide an antenna orientation estimation.

This sub-system executes a trilateration based algorithm for which the locations and orientations of the positioning radio stations 111 (marks) are already known together with a search over orientation parameter grid to deduce the orientation parameters. A distance is used to keep the better solution while searching. Moreover, the combined estimation of the orientation and the location by other methods such as the gradient algorithm or the EM algorithm may be formulated as a special algorithm.

Tools and Settings for the Trilateration Based Algorithm:
Powers received from other L nodes: $\hat{P} = \{\hat{P}_l; l=1, \ldots L\}$
Positions of the other nodes: $M = \{M_l; l=1, \ldots L\}$
The antenna angular power gain profile 112 at the transmitting positioning radio stations 110 $G^{tr} = \{g_l(\Omega); l=1, \ldots L\}$ in which $\Omega$ is the direction of the outgoing wave and can be parameterized by either the polar angles in the 2D plane or by the spherical angles in 3D space.
The antenna angular power gain profile 113 of the receiver node 111 before any rotation $g_0(\Omega)$.
An orientation grid $\Gamma = \{\Gamma_i; i=1, \ldots, I\}$ composed of a set of I triplets of Euler angles when the rotation holds in 3D space or a set of I angles on the unit circle for a rotation in 2D plane.
Channel gains: $h = \{h_l/l=1 \ldots L\}$. They can be expressed in general as:

$$h_l = \frac{C_l}{d_l^\alpha},$$

where $\alpha$ and $C_l$ are two positive constants.
A classical trilateration algorithm with inputs the set of parameters H and M and with output the location coordinates $M_0$. $M_0 = \text{Tril}(H,M)$ The Algorithm:
Initialization: Fix the initial distance $\delta^{(old)}$ to a high value and fix the convergence distance $\delta^{(\infty)}$
Run a search over the grid $\Gamma$
For each $\Gamma_i$, run the following initialization
Chose any set $H^{(new)}$ of path loss parameters
Initialize the location parameters to: $M_0^{(new)} = \text{Tril}(H^{(new)}, M)$
Calculate the directions toward the L nodes $\Omega^{(new)} = \{\Omega_l^{(new)}; l=1, \ldots L\}$ from $M_0^{(new)}$ and M
Calculate the directional gain set at the receiving node:

$$G^{rec(new)} = \{g_0^{(rec)}(\Omega_l^{(new)}, \Gamma_i); l=1, \ldots L\}$$

Calculate the new powers: $P^{(new)} = \{P_l^{(new)}; l=1, \ldots L\}$, where $$P_l^{(new)} = g_0^{(rec)}(\Omega_l^{(new)}, \Gamma_i) g_l^{(tr)}(\Omega_l^{(new)}) h_l^{(new)}$$

Calculate the average distance between calculated and received powers:

$$\delta_i^{(new)} = \sum_{l=1}^{l} (P_l^{(new)} - \hat{P}_l)^2$$

End=0
While End=0, repeat
  $\delta_i^{(old)} \leftarrow \delta_i^{(new)}$ and $h^{(old)} \leftarrow h^{(new)}$
  Calculate the new the location parameters from $H^{(old)}$ and M:

$M_0^{(new)} = \text{Tril}(H^{(old)}, M)$

Calculate the directions toward the L nodes $\Omega^{(new)} = \{\Omega_l^{(new)}; l=1, \ldots L\}$ from $M_0^{(new)}$ and M Calculate the directional gain set at the receiving node:

$G^{rec(new)}\{g_0^{(rec)}(\Omega_l^{(new)}, \Gamma_l); l=1, \ldots L\}$

Calculate the new powers: $P^{(new)} = \{P_l^{(new)}; l=1, \ldots L\}$, where $P_l^{(new)} = g_0^{(rec)}(\Omega_l^{(new)}, \Gamma_l); g_l^{(tr)}(\Omega_l^{(new)}) h_l^{(old)}$ Crucial: force the path loss parameters to $h_l^{(new)} = \hat{P}_l / g_0^{(rec)}(\Omega_l^{(new)}, \Gamma_l) g_l^{(tr)}(\Omega_l^{(new)})$ Important: Reduce the transmitting nodes to those with finite path loss $h_l^{(new)}$
  Calculate the new distance $$\delta^{(new)} = \sum_{l=1}^{l} (P_l^{(new)} - \hat{P}_l)^2$$

If $|\delta^{(new)} - \delta^{(old)}| < \epsilon$, End=1
Choose as index on the grid the one satisfying $j = \arg_i(\delta_i)$ Deduce the orientation as $\Gamma_j$ and the corresponding location parameter.

The invention claimed is:

1. A system for determining spatial location and orientation of one or more mobile nodes, comprising:
   at least one radio station configured to determine an estimated orientation and an estimated location of each node of the one or more mobile nodes having a direct line of sight (LOS) to the at least one radio station, wherein each radio wave propagation path therebetween is characterized by a direction of departure (DOD), a transmit polarization, a direction of arrival (DOA), and a receive polarization;
   at least one of the at least one radio station and the one or more mobile nodes including:
     a multiple antenna system including a polarization selection-switching unit;
     a radio transceiver configured with spatial filtering;
     a time filtering module configured to perform a first filtering process on received signal vectors, the first filtering process allowing for a classification of transmitting nodes of the one or more mobile nodes onto at least one vector set, wherein each vector set of the at least one vector set is a collection of vectors having substantially the same strengths and substantially the same time of arrival properties;
   a multiple input multiple output (MIMO) channel matrices module configured to operate on each vector set of the at least one vector set to provide an estimated quadruple MIMO channel matrix, the estimated quadruple MIMO channel matrix composed of a plurality of co-polarized MIMO matrices and a plurality of cross-polarized MIMO channel matrices, wherein the MIMO channel matrices module is further configured to determine at least one of a plurality of estimated receive correlation matrices and a plurality of estimated transmit correlation matrices;
   a multipath DOA and DOD estimation module configured to operate on one of at least one estimated correlation matrix corresponding to unpaired transmitter and receiver polarizations and at least one estimated correlation matrix determined using the plurality of cross-polarized MIMO channel matrices;
   a control module configured to operate on the plurality of cross-polarized MIMO channel matrices to control the multipath DOA and DOD estimation module in order to operate a detection method;
   wherein the plurality of receive correlation matrices corresponding to a plurality of unpaired polarization mode is used to determine a plurality of multipath azimuth-elevation of angle of arrival (AOA) estimates;
   wherein the plurality of transmit correlation matrices corresponding to a plurality of unpaired polarization mode is used to determine a plurality of multipath azimuth-elevation of angle of departure (AOD) estimates;
   wherein a signal power on the plurality of AOA estimates obtained on the plurality of unpaired polarization modes forms a receive polarization-space spectrum, and
   wherein a signal power on the plurality of AOD estimates forms a transmit polarization-space spectrum;
   wherein the control module is configured to utilize one of a MUSIC algorithm and a MVR algorithm providing each two polarization-space spectra of the multipath received signals;
   wherein a combination of two receive polarization-space spectra provides a common receive spectrum, and wherein the combination of two transmit polarization-space spectra provides a common transmit spectrum;
   a multipath tilt angles and channel gains estimation module configured to use the multipath DOA and DOD estimation module and the MIMO channel matrices module to estimate at least one of:
     a signal strength and a tilt angle of outgoing wave (TAOUT) for each estimated DOD parameter; and
     a signal strength and a tilt angle of oncoming wave (TAON) for each estimated DOA parameter;
   a co-polarized channel filtering module configured to remove multipath channel components from the co-polarized channel matrices; the co-polarized channel filtering module further configured to output a multipath originated reconstituted co-polarized MIMO matrix by using as inputs:
     a plurality of DOA estimates and a plurality of DOD estimates provided by the multipath DOA and DOD estimation module, and
     the co-polarized MIMO matrices provided by the MIMO channel matrices module;

wherein the MIMO channel matrices module re-estimates the channel gain and tilt angles for each pair of DOA/DOD angles using the reconstituted co-polarized MIMO matrix outputted by the co-polarized channel filtering module;

a LOS DOA and DOD estimation module configured to operate on the filtered co-polarized channel matrices provided by the co-polarized channel filtering module and configured to utilize one of the MUSIC algorithm and the MVR algorithm selected by the control module in order to output a first data including at least one set of DOA and DOD couples of azimuth and elevation angles corresponding to LOS paths;

a LOS multipath tilt angles and channel estimation module configured to use the first data outputted by the LOS DOA and DOD estimation module and the reconstituted co-polarized MIMO matrix outputted by the co-polarized channel filtering module to output a second data including estimates on each LOS of the TAON and the TAOUT;

a position and orientation finder module configured to use the second data outputted by the LOS multipath tilt angles and channel estimation module for determining the estimated location and the estimated orientation of each transmitting node of the one or more mobile nodes with identified LOS.

2. The system for determining spatial orientation and localization of claim 1, wherein the multipath tilt angles and channel gains estimation module performs a pairing operation to associate at least one DOD estimated parameter to each DOA estimated parameter.

3. The system for determining spatial orientation and localization of claim 1, wherein the plurality of co-polarized MIMO matrices are obtained when similar circular polarization modes are used at both transmitters and receiver sides.

4. The system for determining spatial orientation and localization of claim 1, wherein the plurality of cross-polarized MIMO channel matrices obtained when different circular polarization modes are used at both transmitters and receiver sides.

5. The system for determining spatial orientation and localization of claim 1, wherein the at least one unpaired polarization mode includes at least one of a right-hand circular polarization (RHCP) and a left-hand circular polarization (LHCP).

6. The system for determining spatial orientation and localization of claim 1, wherein the position and orientation finder module is further configured to use the reconstituted co-polarized MIMO matrix outputted by the co-polarized channel filtering module for determining the estimated location and the estimated orientation of each transmitting node of the one or more mobile nodes with identified LOS.

7. The system for determining spatial orientation and localization of claim 6, wherein the position and orientation finder module is further configured to use the first data outputted by the LOS DOA and DOD estimation module for determining the estimated location and the estimated orientation of each transmitting node of the one or more mobile nodes with identified LOS.

8. A system for determining spatial location and orientation of one or more mobile nodes, comprising:

at least one radio station configured to determine an estimated orientation and an estimated location of each node of the one or more mobile nodes having a direct line of sight (LOS) to the at least one radio station, wherein each radio wave propagation path therebetween is characterized by a direction of departure (DOD), a transmit polarization, a direction of arrival (DOA), and a receive polarization;

at least one of the at least one radio station and the one or more mobile nodes including:
a multiple antenna system including a polarization selection-switching unit;
a radio transceiver configured with spatial filtering;
a time filtering module configured to perform a filtering process on received signal vectors, the filtering process allowing for a classification of transmitting nodes of the one or more mobile nodes onto at least one vector set;
a multiple input multiple output (MIMO) channel matrices module configured to operate on each vector set of the at least one vector set to provide an estimated quadruple MIMO channel matrix, the estimated quadruple MIMO channel matrix composed of plurality of co-polarized MIMO matrices and a plurality of cross-polarized MIMO channel matrices, wherein the MIMO channel matrices module is further configured to determine at least one of a plurality of estimated receive correlation matrices and a plurality of estimated transmit correlation matrices;
a multipath DOA and DOD estimation module configured to operate on one of at least one estimated correlation matrix corresponding to unpaired transmitter and receiver polarizations and at least one estimated correlation matrix determined using the plurality of cross-polarized MIMO channel matrices;
a control module configured to operate on the plurality of cross-polarized MIMO channel matrices to control the multipath DOA and DOD estimation module in order to operate a detection method;
a LOS DOA and DOD estimation module configured to operate on filtered co-polarized channel matrices to output a first data including at least one set of DOA and DOD couples of azimuth and elevation angles corresponding to LOS paths;
a LOS multipath tilt angles and channel estimation module configured to use the first data and a reconstituted co-polarized MIMO matrix to output a second data; and
a position and orientation finder module configured to use the second data for determining the estimated location and the estimated orientation of each transmitting node of the one or more mobile nodes with identified LOS.

9. The system for determining spatial orientation and localization of claim 8, wherein each vector set of the at least one vector set is a collection of vectors having substantially the same strengths and substantially the same time of arrival properties.

10. The system for determining spatial orientation and localization of claim 8, wherein the plurality of receive correlation matrices corresponding to a plurality of unpaired polarization mode is used to determine a plurality of multipath azimuth-elevation of angle of arrival (AOA) estimates.

11. The system for determining spatial orientation and localization of claim 10, wherein a signal power on the plurality of AOA estimates obtained on the plurality of unpaired polarization modes forms a receive polarization-space spectrum.

12. The system for determining spatial orientation and localization of claim 8, wherein the plurality of transmit correlation matrices corresponding to a plurality of unpaired polarization mode is used to determine a plurality of multipath azimuth-elevation of angle of departure (AOD) estimates.

13. The system for determining spatial orientation and localization of claim 12, wherein a signal power on the plurality of AOD estimates forms a transmit polarization-space spectrum.

14. The system for determining spatial orientation and localization of claim 8, wherein the second data includes estimates on each LOS of a tilt angle of oncoming wave (TAON) and a tilt angle of outgoing wave (TAOUT).

15. The system for determining spatial orientation and localization of claim 8, further comprising:

a co-polarized channel filtering module configured to remove multipath channel components from the co-polarized channel matrices, the co-polarized channel filtering module further configured to output a multipath originated reconstituted co-polarized MIMO matrix by using as inputs:

a plurality of DOA estimates and a plurality of DOD estimates provided by the multipath DOA and DOD estimation module, and the co-polarized MIMO matrices provided by the MIMO channel matrices module.

16. The system for determining spatial orientation and localization of claim 8, further comprising:

a multipath tilt angles and channel gains estimation module configured to use the multipath DOA and DOD estimation module and the MIMO channel matrices module to estimate at least one of:

a signal strength and a tilt angle of outgoing wave (TAOUT) for each estimated DOD parameter; and a signal strength and a tilt angle of oncoming wave (TAON) for each estimated DOA parameter.

* * * * *